United States Patent Office 2,989,539

Patented June 20, 1961

1

2,989,539

3-AMINO-4-PHENYLPYRAZOLES AND METHOD OF PREPARATION

Elvin L. Anderson, Moorestown, N.J., and Harry E. Reiff, Abington, Pa., assignors to Smith Kline & French Laboratories, Philadelphia, Pa., a corporation of Pennsylvania No Drawing. Filed Sept. 14, 1959, Ser. No. 839,561
14 Claims. (Cl. 260—310)

This invention relates to new 3-amino-4-phenylpyrazoles which are therapeutically active compounds and to a novel process for preparation of same.

The new compounds of this invention have utility as pharmacodynamically active agents. More specifically, these compounds are useful as muscle relaxants, i.e., they produce skeletal muscle relaxation. The novel 3-amino-4-phenylpyrazoles of this invention are relatively free of adverse side effects.

The 3-amino-4-phenylpyrazoles of this invention are represented by the general formula:

FORMULA I

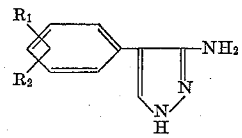

when:

$R_1$ represents hydrogen, lower alkyl, halogen, lower alkoxy, lower alkylthio, lower acyl, lower alkylsulfonyl, trifluoromethyl, trifluoromethylthio, trifluoromethylsulfonyl, trifluoromethoxy, sulfamyl, nitro, carboxy, amino and dilower alkylamino;

$R_2$ represents lower alkyl, halogen, lower alkoxy, lower alkylthio, lower acyl, lower alkylsulfonyl, trifluoromethyl, trifluoromethylthio, trifluoromethylsulfonyl, trifluoromethoxy, sulfamyl, nitro, carboxy, methylenedioxy, amino and dilower alkylamino.

Advantageous compounds of this invention are represented by the above structural formula when:

$R_1$ represents hydrogen;

$R_2$ represents chloro, bromo, fluoro, trifluoromethylsulfonyl, trifluoromethyl and nitro in the 4 position.

Preferred and advantageous compounds of this invention are represented by the above structural formula when:

$R_1$ represents hydrogen;

$R_2$ represents chloro or trifluoromethyl in the 4 position.

The compound of this invention which is particularly useful as a muscle relaxant is 3-amino-4,(4'-chlorophenyl)pyrazole.

By the terms "lower alkyl" or "lower alkoxy" as used herein, branched or straight aliphatic groups having not more than 6 carbon atoms and preferably not more than 4 carbon atoms are indicated. By the term lower acyl as used herein groups having not more than 4 carbon atoms are indicated.

This invention also includes nontoxic pharmaceutically acceptable addition salts of the above defined bases formed with organic and inorganic acids. Such salts are easily prepared by methods known to the art. The base is reacted with either the stoichiometric amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicyclic, citric, gluconic, lactic, malic, mandelic, cinnamic, citranconic, aspartic, stearic, palmitic, itaconic, glycolic, p-aminobenzoic, glutamic, benzenesulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

2

The novel method in accordance with this invention comprises reacting the properly substituted formylphenylacetonitrile with hydrazine hydrate in the presence of glacial acetic acid as represented by the following procedure:

FORMULA II

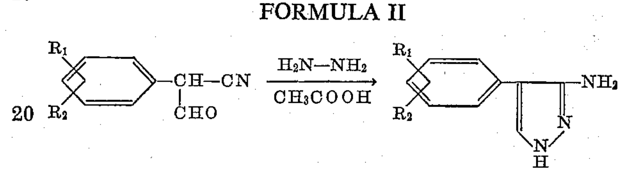

$R_1$ and $R_2$ represent hydrogen, lower alkyl, halogen, lower alkoxy, lower alkylthio, lower acyl, lower alkylsulfonyl, trifluoromethyl, trifluoromethylthio, trifluoromethylsulfonyl, trifluoromethoxy, sulfamyl, nitro, carboxy, methylenedioxy when taken together, amino and dilower-alkylamino.

This method is carried out using readily available starting materials and gives excellent yields of the end product. Where certain compounds desired for use as starting materials are not available they can be prepared by methods described in literature and well-known to the art.

The following general procedure is used to prepare the 3-amino-4-phenylpyrazoles of this invention.

The properly substituted formylphenylacetonitrile is prepared according to the Walther and Schickler treatment described in Journal Prakt. Chem. [2], 55, 331. This comprises reacting the substituted phenylacetonitrile with sodium methoxide and ethyl formate in an inert organic solvent for a period of about one to about three hours at a temperature not exceeding 25° C.

A stirred solution of the formylphenylacetonitrile of Formula II, with about one to about 5 molar equivalents of hydrazine or hydrazine hydrate and glacial acetic acid in an amount to at least neutralize the hydrazine is refluxed in an inert non-polar organic solvent in which the reactants are substantially soluble and which distill azeotropically with water. Exemplary of such organic solvents are the aromatic solvents of 6 to 8 carbon atoms such as benzene, chlorobenzene, toluene and xylene, the halogenated alkanes of 1 to 3 carbon atoms such as chloroform, carbon tetrachloride, the ethereal solvents of 4 to 8 carbon atoms such as dioxane, dibutyl ether and the cycloalkane solvents of 6 to 8 carbons such as cyclohexane. The preferred solvents are the aromatic solvents such as benzene, toluene and xylene. Advantageous yields are received when the water is removed azeotropically with the solvent. The reaction is preferably carried out at a temperature in the range of from about 30° C. to about 140° C. Advantageously temperatures of about 45° C. to about 70° C. are used. It will be recognized that the length of reaction time varies with the amount of reactants and the reaction temperature used. In the preferred range of temperature from about one to seven hours is usually sufficient to complete the reaction. Preferably a period of one to four hours is used. Reaction conditions other than those described above have been found to have little further advantage. The reaction mixture is worked up as follows, when the removal of the water is substantially complete, the mixture is allowed to cool. The mixture is then extracted with an aqueous mineral acid such as for example hydrochloric acid. The acid extracts are clarified with decolorizing charcoal and neutralized with base to a pH in the range of about 6.0 to about 10.0. Preferably the pH will be in the range of from about 6.0 to about 8.0. The solid product is separated and if necessary is recrystallized from a suitable organic solvent such as for example isopropanol or a mixture of hexane and pyridine.

In the case of the substituted compounds where the starting acetonitrile is not available it can be conveniently prepared as described hereafter for the trifluoromethyl analogues. The trifluoromethylbenzoic acid derivative is converted to the ethyl ester by treatment with ethyl alcohol. The ethyl trifluoromethylbenzoate is then reduced to the benzyl alcohol which in turn is converted to the benzyl chloride. Treatment of the trifluoromethylbenzylchloride with sodium cyanide yields the desired trifluoromethylphenylacetonitrile. Other methods of preparing these compounds are reported in literature. However, this method is a simple preparation which has been found to be satisfactory.

The 3-amino-4-phenylpyrazole derivatives of this invention are preferably employed in pharmaceutical form, such as tablets, capsules, powders, suspension, pills, boluses, ampuls, syrups or gels. If a solid carrier is used, the preparation is tableted, placed in a hard gelatin capsule or in the form of a troche or lozenge. The amount of solid carrier will vary widely but preferably is from about 25 mg. to about 1 gm. If a liquid carrier is used the preparation is in the form of a soft gelatin capsule, placed in an ampule or in a liquid suspension.

The following examples are not limiting but are illustrative of compounds of this invention and the procedures for their preparation.

*Example 1*

In a suitable vessel, 3 liters of benzene, 296 g. of ethyl formate and 237 g. of sodium methoxide are stirred and the mixture is allowed to cool to about 15°–20° C. To the well stirred suspension is added portionwise, over an hour period, 601 g. of 4-chlorophenylacetonitrile at such a rate that the reaction temperature does not exceed 20° C. After the addition is complete, the cooled mixture is stirred for an additional half hour. The stirring is continued and the mixture is allowed to cool at 12 liters of distilled water are added. The aqueous layer is separated and acidified with hydrochloric acid. The solid is removed and washed free of acid with water. A final wash with 750 ml. of benzene is accomplished to remove colored impurities. The material is dried under reduced pressure at 40–50° C. and there is obtained α-formyl-4-chlorophenylacetonitrile.

To a stirred mixture of 418 g. of hydrazine hydrate (85% in water), 695 mls. of glacial acetic acid and 4 liters of benzene is added 947 g. of α-formyl-4-chlorophenylacetonitrile at such a rate that the temperature does not exceed 60° C. over a one hour period. After the addition is complete, the mixture is refluxed for five hours and the water is completely removed azeotropically. The mixture is cooled and then extracted with 7 liters of 10% hydrochloric acid. The acid extracts are combined and treated with decolorizing charcoal, the clarified filtrates are neutralized with sodium hydroxide solution to a pH of 10, cooled and the solid separated. The solid is washed well with water and dried at 50–60° C. in a vacuum oven. Recrystallization with isopropanol yields 3-amino-4-(4′-chlorophenyl)pyrazole with a melting point of 141 to 143° C. A solution of 2.0 g. of the base in 50 ml. of dry ether is treated with ethereal hydrogen chloride to yield the hydrochloride salt.

*Example 2*

To a stirred cool mixture of 300 ml. of xylene, 29.6 g. of ethyl formate and 23.7 g. of sodium methoxide is slowly added 58.8 g. of 3-methoxyphenylacetonitrile. After the addition is complete the cooled mixture is stirred and 4.5 liters of distilled water are added. The water layer is separated, acidified with hydrochloric acid and the solid is removed. The solid is washed with water and then 300 ml. of benzene. The material is dried under reduced pressure to yield α-formyl-3-methoxyphenylacetonitrile.

A mixture of 22.4 g. of hydrazine, 69.5 mls. of glacial acetic acid and 400 ml. of xylene is stirred and to this mixture is slowly added 91.3 g. of α-formyl-3-methoxyphenylacetonitrile maintaining the temperature below 55° C. Upon completion of the addition the mixture is refluxed for two hours, the water removed azeotropically, cooled and extracted with 10% sulfuric acid. The acid extracts are combined and treated with decolorizing charcoal. The clarified filtrates are neutralized with sodium hydroxide solution to a pH of 10, cooled and the solid separated. The solid is washed with water and dried in a vacuum oven and then recrystallized with a hexane-pyridine mixture yielding 3-amino-4-(3′-methoxyphenyl)-pyrazole.

Treating the base with maleic acid in ethyl acetate results in the formation of the maleate salt.

*Example 3*

A mixture of 150 ml. of toluene, 14.8 g. of ethyl formate and 11.8 g. of sodium methoxide is stirred and cooled to 18° C. To this mixture is slowly added 26.2 g. of 2-methylphenylacetonitrile and stirring continued for an additional one half hour. The mixture is cooled and 2 liters of water are added, separate the water layer and acidify with hydrochloric acid. The solid is removed and washed with water and finally benzene. The material is dried under reduced pressure to yield α-formyl-2-methylphenylacetonitrile.

To a stirred mixture of 20.9 g. of 85% hydrazine hydrate, 34.7 mls. of glacial acetic acid and 200 ml. of toluene 42.0 g. of α-formyl-2-methylphenylacetonitrile is slowly added and the temperature maintained below 58° C. Upon completion of the addition the mixture is refluxed for one hour with the azeotropic removal of the water, cooled and extracted with 10% hydrochloric acid. The acid extracts are combined and treated with 40 g. of decolorizing charcoal. The filtrates are neutralized with sodium hydroxide cooled and the solid separated. The solid is treated with water and dried in a vacuum oven to yield 3-amino-4-(2′-methylphenyl)pyrazole. Treating a solution of the free base in ethyl acetate with tartaric acid gives the corresponding tartrate salt.

*Example 4*

To a solution of 4 liters of ether containing 151.6 g. of lithium aluminum hydride is slowly added a solution containing 306.2 g. of 4-methylthiobenzaldehyde in 2 liters of ether. The mixture is refluxed for 6 hours, cooled, decomposed with water and the ether separated. The product is dried over anhydrous magnesium sulfate and chloroform distilled yielding 4-methylthiobenzylalcohol.

A solution of 310.2 g. of 4-methylthiobenzylalcohol in 3 liters of benzene is treated with 285.4 g. of thionyl chloride and refluxed for seven hours. The solvent is removed by distillation, residue quenched in ice water and extracted with benzene. The extract is washed and then dried over anhydrous magnesium sulfate and chloroform distilled to yield 4-methylthiobenzylchloride.

To a solution of 347 g. of 4-methylthiobenzylchloride in 5 liters of ethanol is slowly added 147 g. of sodium cyanide. After the addition is complete the mixture is refluxed for 8 hours. The solvent is distilled, residue quenched in water and then extracted with benzene. The product is distilled to yield 4-methylthiophenylacetonitrile.

To a stirred mixture of 600 ml. of benzene 59.2 g. of ethyl formate and 47.4 g. of sodium methoxide which is cooled to about 20° C. is added portionwise 130.4 g. of 4-methylthiophenylacetonitrile. Upon completion of the addition stir the mixture for an additional one-half hour and then add 8 liters of distilled water. The water layer is separated, acidified with hydrochloric acid and the solid removed. The solid is washed with water followed by a benzene wash. The material is dried under reduced pressure to yield α-formyl-4-methylthiophenylacetonitrile.

A mixture of 45 g. of hydrazine 139 mls. of glacial acetic acid and 800 ml. of benzene is stirred and to this mixture is slowly added 200 g. of α-formyl-4-methylthiophenylacetonitrile with the temperature of the mixture remaining about 55° C. The mixture is then refluxed for three hours, cooled and extracted with 10% hydrochloric acid. The acid extracts combined and treated with decolorizing charcoal. The filtrates are neutralized with sodium hydroxide solution, cooled and the solid separated. The solid is washed with water, dried in a vacuum oven, and recrystallized with isopropanol to yield 3-amino-4-(4'-methylthiophenyl)pyrazole.

*Example 5*

A stirred solution of 382 g. of 4-trifluoromethyl benzoic acid, 92.14 g. of ethanol, 5 g. of p-toluenesulfonic acid in 2 liters of chloroform is refluxed for six hours with separation of water. The solution is cooled, washed with 10% sodium bicarbonate solution and dried over anhydrous magnesium sulfate and chloroform distilled to yield ethyl-4-trifluoromethylbenzoate.

To a solution of 75.8 g. of lithium aluminum hydride in 2 liters of ether is added dropwise a solution containing 219 g. of ethyl-4-trifluoromethylbenzoate in one liter of ether and the mixture is refluxed for four hours, cooled, decomposed with water and ether separated. The product is dried over anhydrous magnesium sulfate and chloroform distilled yielding 4-trifluoromethylbenzyl alcohol.

A solution of 177.13 g. of 4-trifluoromethylbenzyl alcohol in 1.5 liters of benzene is treated with 142.7 g. of thionyl chloride and refluxed for five hours. The solvent is stripped by distillation, residue quenched in ice water, extracted with benzene and the extract is washed and then dried over anhydrous magnesium sulfate and chloroform distilled to yield 4-trifluoromethylbenzyl chloride.

To 195.58 g. of 4-trifluoromethylbenzyl chloride in 3 liters of ethanol is slowly added 73.5 g. of sodium cyanide. Upon completion of addition the mixture is refluxed for 6 hours. The solvent is distilled, the residue quenched in ice water and extracted with benzene. The product is distilled to yield 4-trifluoromethylphenylacetonitrile.

To a stirred mixture of 1.5 liters of benzene, 148 g. of ethyl formate and 118.5 g. of sodium methoxide is slowly added 384.7 g. of 4-trifluoromethylphenylacetonitrile. After the addition is complete the cooled mixture is stirred and 6 liters of water added. The water layer is separated, acidified with hydrochloric acid and the solid removed. The solid is washed with water and then benzene. The product is dried under reduced pressure to yield α-formyl-4-trifluoromethylphenylacetonitrile.

A mixture of 209 g. of hydrazine hydrate, 350 mls. of glacial acetic acid and 2 liters of benzene is stirred and to this mixture is slowly added 561 g. of α-formyl-4-trifluoromethylphenylacetonitrile while maintaining the temperature around 60° C. When the addition is complete the mixture is refluxed for three hours with the azeotropic removal of the water. The mixture is cooled and extracted with phosphoric acid. The acid extracts are combined, decolorized with charcoal and the clarified filtrates neutralized with sodium hydroxide solution, cooled and the solid is separated. The solid is washed with water and dried in a vacuum oven yielding 3-amino-4-(4'-trifluoromethylphenyl)pyrazole.

*Example 6*

To a stirred mixture of 3.3 liters of benzene 91.8 g. of sodium methoxide, 134.2 g. of ethyl formate is slowly added 264 g. of 3-acetylphenylacetonitrile and stirring continued for two additional hours. The mixture is then treated with water to dissolve the solids. The water layers are combined and washed with benzene and then acidified with hydrochloric acid. The precipitated solids are collected by centrifugation and dried in vacuo at 75° C. to yield α-formyl-3-acetylphenylacetonitrile.

A mixture of 850 ml. of benzene, 121.6 g. of α-formyl-3-acetylphenylacetonitrile, 49.5 g. of hydrazine hydrate and 82.3 ml. of glacial acetic acid is stirred and brought to reflux for 2½ hours with water being removed azeotropically. The mixture is cooled to room temperature and extracted with 10% hydrochloric acid. The acid extract is treated with Darco and the filtrate neutralized with sodium hydroxide solution. The solid is separated, washed with water and dried in a vacuum oven yielding 3-amino-4-(3'acetylphenyl)pyrazole. A solution of the base in ether is treated with glacial acetic acid to give the acetate salt.

*Example 7*

A mixture of 6 liters of xylene, 592 g. of ethyl formate and 475 g. of sodium methoxide is stirred and to this mixture is slowly added 1305 g. of 4-nitrophenylacetonitrile and stirring is continued for an additional hour. The mixture is then treated with water and the water layers are combined and washed with benzene and then acidified with hydrochloric acid. The solid is removed, washed with water and then benzene. The product is dried to yield α-formyl-4-nitrophenylacetonitrile.

To a stirred mixture of 835 g. of hydrazine hydrate, 1390 mls. of glacial acetic acid and 8 liters of xylene is slowly added 2006 g. of α-formyl-4-nitrophenylacetonitrile. After addition is complete the mixture is refluxed for two hours with the removal of the water, cooled and extracted with 10% hydrochloric acid. The acid extracts are combined and treated with Super-Cel and Darco. The filtrates are neutralized with concentrated ammonium hydroxide and the solid is separated, treated with water and dried to yield 3-amino-4-(4'-nitrophenyl)pyrazole.

*Example 8*

α-Formyl-4-methylsulfonylphenylacetonitrile is prepared by mixing and refluxing 3 liters of benzene, 296 g. of ethyl formate, 237.5 g. of sodium methoxide and 784.56 g. of 4-methylsulfonylphenylacetonitrile as described in the previous examples.

A mixture of 417.5 g. of hydrazine hydrate, 695 mls. of glacial acetic acid and 4 liters of benzene is stirred and to this is slowly added 1115.7 g. of α-formyl-4-methylsulfonylphenylacetonitrile. The mixture is refluxed for two hours with the azeotropic removal of water, cooled and extracted with 10% sulfuric acid. The acid extracts are combined and give the Darco treatment. The filtrates are neutralized with concentrated ammonium hydroxide and the solid separated, washed and dried yielding 3-amino-4-(4'-methylsulfonylphenyl)pyrazole.

*Example 9*

3-trifluoromethylthiophenylacetonitrile is prepared from 3-trifluoromethylthiobenzoic acid by formation of the ethyl ester, reduction of the ester to the benzyl alcohol, conversion of the benzyl alcohol to the benzyl chloride and finally treatment with sodium cyanide to give the desired 3-trifluoromethylthiophenylacetonitrile is detailed in Example 5.

The α-formyl-3-trifluoromethylthiophenylacetonitrile compound is prepared by mixing and refluxing 11 liters of benzene, 306 g. of sodium methoxide, 447 g. of ethyl formate and 1199 g. of 3-trifluoromethylthiophenylacetonitrile for one hour. The refluxed mixture is treated with water, acidified with 10% hydrochloric acid and the solid removed. The solid is washed and then dried yielding α-formyl-3-trifluoromethylthiophenylacetonitrile.

To a stirred mixture of 2.8 liters of benzene, 165 g. of hydrazine hydrate and 274 ml. of glacial acetic acid is added 513.3 g. of α-formyl-3-trifluoromethylthiophenylacetonitrile and the mixture is refluxed for one hour with the removal of water. The mixture is cooled, extracted with 10% hydrochloric acid and the acid extracts are decolorized with Darco. The filtrates are neutralized with sodium hydroxide solution and the solid is separated yielding 3-amino-4-(3'-trifluoromethylthiophenyl)pyrazole.

*Example 10*

The 4-trifluoromethylsulfonylphenylacetonitrile derivative is prepared from 4-trifluoromethylsulfonylbenzoic acid by forming the ester, reducing the ester to the benzyl alcohol, converting the benzyl alcohol to the benzyl chloride and treatment of the benzyl chloride derivative with sodium cyanide as detailed in Example 5.

A mixture of 4 liters of toluene, 394 g. of ethyl formate and 317 g. of sodium methoxide as stirred and to this is added 1325.7 g. of 4-trifluoromethylsulfonylphenylacetonitrile. Stirring is continued for one hour, mixture cooled, treated with water and the water layer separated and acidified with hydrochloric acid. The solid is subjected to a water and benzene washing and dried under reduced pressure yielding α-formyl-4-trifluoromethylsulfonylphenylacetonitrile.

A total of 304 g. of hydrazine is stirred into a mixture of 927 mls. of glacial acetic acid, 5.3 liters of benzene and 1939 g. of α-formyl-4-trifluoromethylsulfonylphenylacetonitrile. The mixture is refluxed for 4 hours with the complete removal of water, cooled and extracted with 10% hydrochloric acid. The acid extracts are decolorized and neutralized with ammonium hydroxide. The solid is separated washed and dried in a vacuum oven yielding 3-amino-4-(4'-trifluoromethylsulfonylphenyl)pyrazole. Treating a sample of the free base in ether solution with excess anhydrous hydrogen bromide yields the hydrobromide salt.

*Example 11*

A mixture of 5.5 liters of benzene, 153 g. of sodium methoxide and 224 g. of ethyl formate is stirred and cooled and to this mixture is slowly added 440 g. of 2-carboxyphenylacetonitrile. The mixture is cooled and treated with water and the aqueous layer acidified with hydrochloric acid. The solid material is removed, washed with water and then benzene, and finally dried yielding α-formyl-2-carboxyphenylacetonitrile.

To a stirred mixture of 1.5 liters of benzene 8.3 g. of hydrazine hydrate and 137 ml. of glacial acetic acid is slowly added 206 g. of α-formyl-2-carboxyphenylacetonitrite and the temperature maintained below 60° C. The mixture is refluxed for one hour with the water being removed azeotropically. The mixture is cooled and extracted with 10% hydrochloric acid. The acid extracts are combined, decolorized and neutralized with sodium hydroxide. The solid is separated, treated with water and dried to yield 3-amino-4-(2'-carboxyphenyl)pyrazole.

*Example 12*

To a stirred mixture of 2 liters of benzene 197 g. of ethyl formate and 158 g. of sodium methoxide is slowly added 630.8 g. of 3-sulfamylphenylacetonitrile. Upon completion of addition the mixture is cooled and stirred with the addition of water to dissolve solids present. The water layer is separated, acidified with hydrochloric acid and the solid removed. The solid is washed with water and then benzene, dried under reduced pressure yielding α-formyl-3-sulfamylphenylacetonitrile.

A mixture of 279 g. of hydrazine hydrate (85% in water), 464 mls. of glacial acetic acid and 3.2 liters of benzene is stirred and to this is added 784.4 g. of α-formyl-3-sulfamylphenylacetonitrile. The mixture is then refluxed for two hours, water removed azeotropically, cooled and extracted with 10% hydrochloric acid. The acid extracts are combined, decolorized and neutralized with sodium hydroxide solution. The solid is separated washed with water, dried in a vacuum oven to yield 3-amino-4-(3'-sulfamylphenyl)pyrazole.

*Example 13*

4-trifluoromethoxyphenylacetonitrile is prepared from 4-trifluoromethoxybenzoic acid as detailed in Example 5. This procedure consists of converting the benzoic acid derivative to the ethyl ester, reduction of the ester to the benzyl alcohol, conversion of the benzyl alcohol to the benzyl chloride and treatment of the 4-trifluoromethoxybenzylchloride with sodium cyanide to give the desired 4-phenylacetonitrile.

A mixture of 7.2 liters of benzene, 229.6 g. of sodium methoxide, 335.5 g. of ethyl formate is stirred and to this is slowly added 828.7 g. of 4-trifluoromethoxyphenylacetonitrile with continued stirring for one hour. The suspension is then treated with water to dissolve solids, the water layers are combined and washed with benzene and then acidified with 10% hydrochloric acid. The solid is removed, washed with water and then benzene and dried yielding α-formyl-4-trifluoromethoxyphenylacetonitrile.

To a stirred mixture of 2.1 liters of benzene, 102 g. of hydrazine, 206 ml. of glacial acetic acid is slowly added 343.7 g. of α-formyl-4-trifluoromethoxyphenylacetonitrile. The mixture is refluxed for one hour with the removal of water, cooled and extracted with 10% hydrochloric acid. The acid extracts are combined and decolorized with Darco. The filtrates are neutralized with concentrated ammonium hydroxide, the solid separated, washed with water, and dried yielding 3-amino-4-(4'-trifluoromethoxyphenyl)pyrazole.

*Example 14*

α-Formyl-3,4-methylenedioxyphenylacetonitrile is prepared by mixing and refluxing 2.75 liters of benzene, 7.65 g. of sodium methoxide, 112 g. of ethyl formate and 225.6 g. of 3,4-methylenedioxyphenylacetonitrile and treating the refluxed mixture as described in Example 13.

A mixture of 750 ml. of benzene, 41.5 g. of hydrazine hydrate and 69 ml. of glacial acetic acid is stirred and to this is slowly added 101 g. of α-formyl-3,4-methylenedioxyphenylacetonitrile. The mixture is refluxed for one hour with the azeotropic removal of water. The mixture is extracted with dilute hydrochloric acid, the acid extracts combined, decolorized and then neutralized with sodium hydroxide solution. The solid is separated, washed with water and dried yielding 3-amino-4-(3',4'-methylenedioxyphenyl)pyrazole.

*Example 15*

A mixture of 6.6 liters of xylene, 183.6 g. of sodium methoxide and 268.4 g. of ethyl formate is stirred and to this mixture is slowly added 436 g. of 4 aminophenylacetonitrile and stirring is continued. The mixture is treated with water, the water layers combined and washed with benzene and acidified with hydrochloric acid. The solid is removed, washed and then dried to yield α-formyl-4-aminophenylacetonitrile.

To a stirred mixture of 99 g. of hydrazine hydrate, 165 ml. of glacial acetic acid and 1.7 liters of xylene is slowly added 206.8 g. of α-formyl-4-aminophenylacetonitrile. After complete addition the mixture is refluxed for one hour with the azeotropic removal of water, cooled and extracted with 10% hydrochloric acid. The acid extracts are combined and treated with Super-Cel and Darco. The filtrates are neutralized with concentrated ammonium hydroxide and the solid is separated, washed with water and dried to yield 3-amino-4-(4'-aminophenyl)pyrazole. Treating a solution of the free base in ethyl acetate with lactic acid yields the lactate salt.

*Example 16*

To a stirred mixture of 2.4 liters of benzene, 237 g. of ethyl formate and 190 g. of sodium methoxide is cautiously added 595.6 g. of 2,6-dichlorophenylacetonitrile and stirring continued for one hour. The solids are dissolved with water and the water layer washed with benzene and acidified with hydrochloric acid. The precipitated solids are centrifuged and dried in vacuo at 75° C. yielding α-formyl-2,6-dichlorophenylacetonitrile.

A mixture of 330 g. of hydrazine hydrate (85% in water), 560 ml. of glacial acetic acid, 3.3 liters of benzene and 895.1 g. of α-formyl-2,6-dichlorophenylacetonitrile is stirred and brought to reflux for one hour with the azeotropic removal of water. The mixture is cooled to room temperature and extracted with 10% hydrochloric acid. The acid extract is decolorized with Darco and the filtrate neutralized with sodium hydroxide solution. The solid is separated washed with water and dried in a vacuum oven yielding 3-amino-4-(2',6'-dichlorophenyl)pyrazole. The base is reacted with bismethylenesalicyclic acid in ethyl acetate solution to give 3-amino-4-(2',6'-dichlorophenyl)pyrazole bismethylenesalicylate.

*Example 17*

The α-formyl-5-chloro-2-methoxy derivative of phenylacetonitrile is prepared from 5-chloro-2-methoxyphenylacetonitrile by mixing 3.7 liters of benzene, 102 g. of sodium methoxide, 149 g. of ethyl formate, and 333 g. of 5-chloro-2-methoxyphenylacetonitrile and treating the mixture as detailed in Example 16.

To a stirred mixture of 950 ml. of benzene, 55 g. of hydrazine hydrate (85% in water) and 90 ml. of glacial acetic acid is added 146 g. of α-formyl-5-chloro-2-methoxyphenylacetonitrile and the mixture is refluxed for one hour with the removal of water. The mixture is cooled, extracted with hydrochloric acid and the acid extracts are decolorized. The filtrates are neutralized with ammonium hydroxide and the solid is separated, washed and dried to yield 3-amino-4-(5'-chloro-2'-methoxyphenyl)-pyrazole.

*Example 18*

A mixture of 12 liters of benzene, 1184 g. of ethyl formate, and 950 g. of sodium methoxide is stirred and to this is slowly added 2560 g. of 4-dimethylaminophenylacetonitrile and stirring continued for one hour. The mixture is treated with water and the solids dissolved. The water layer is washed with benzene and acidified with hydrochloric acid. The solid is removed, washed and then dried to yield α-formyl-4-dimethylaminophenylacetonitrile.

To a stirred mixture of 1670 g. of hydrazine hydrate (85% in water), 2780 mls. of glacial acetic acid, and 16 liters of benzene is cautiously added 3929 g. of α-formyl-4-dimethylaminophenylacetonitrile and the mixture is refluxed for 10 hours with the removal of water azeotropically. The mixture is cooled, extracted with 10% hydrochloric acid and the acid extracts are combined and decolorized. The filtrates are neutralized with ammonium hydroxide and the solid is separated, washed with water and dried to yield 3-amino-4-(4'-dimethylaminophenyl)pyrazole.

*Example 19*

In a suitable vessel 4.7 liters of benzene, 131.2 g. of sodium methoxide and 191.2 g. of ethyl formate are stirred and cooled to about 20° C. To the well stirred suspension is added portionwise 472.8 g. of 4-bromophenylacetonitrile. Upon completion of the addition the suspension is stirred for an additional half hour and water added. The water layer is separated, acidified with hydrochloric acid and the solid removed. The solid is washed with water and then benzene. The product is dried under reduced pressure to yield α-formyl-4-bromophenylacetonitrile.

A mixture of 1.4 liters of benzene, 201.6 g. of α-formyl-4-bromophenylacetonitrile, 71 g. of hydrazine hydrate and 120 ml. of glacial acetic acid is refluxed for one hour with the azeotropic removal of water. The mixture is cooled and extracted with 10% hydrochloric acid, the acid extracts are combined and decolorized with charcoal. The filtrates are neutralized with sodium hydroxide solution, cooled and the solid separated. The solid is washed with water, dried and recrystallized with a hexane-pyridine mixture to yield 3-amino-4-(4'-bromophenyl)pyrazole.

A solution of the base in dry ether is treated with ethereal hydrogen chloride to yield the hydrochloride salt.

*Example 20*

To a stirred suspension of 1.7 liters of benzene, 169 g. of ethyl formate and 136 g. of sodium methoxide is slowly added 313 g. of 4-fluorophenylacetonitrile. The suspension is stirred and water added to dissolve solids, the water layer separated and acidified with hydrochloric acid. The solid is subjected to a water and benzene washing and dried under reduced pressure yielding α-formyl-4-fluorophenylacetonitrile.

A suspension of 131 g. of hydrazine, 400 ml. of glacial acetic acid and 2.3 liters of benzene is stirred and to this suspension is slowly added 489 g. of α-formyl-4-fluorophenylacetonitrile. Upon completion of the addition the mixture is refluxed for one hour with the removal of water, cooled and extracted with phosphoric acid. The acid extracts are combined and decolorized. The filtrates are neutralized with ammonium hydroxide, and the solid is separated. The solid is washed with water, dried in a vacuum oven and then recrystallized with isopropanol to yield 3-amino-4-(4'-fluorophenyl)pyrazole.

Treating a solution of the free base in ethyl acetate with benzoic acid gives the benzoate salt.

What is claimed is:

1. Chemical compounds of the class consisting of a free base and its nontoxic pharmaceutically acceptable acid addition salts, the free base having the formula:

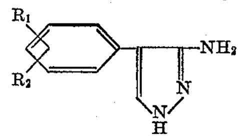

wherein:

$R_1$ is hydrogen, and $R_2$ is a member selected from the group consisting of chloro, bromo, fluoro, trifluoromethylsulfonyl, trifluoromethyl and nitro.

2. A chemical compound having the formula:

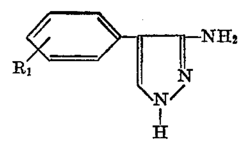

wherein $R_1$ is chloro.

3. A chemical compound having the formula:

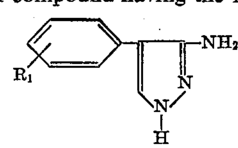

wherein $R_1$ is trifluoromethyl.

4. A chemical compound having the formula:

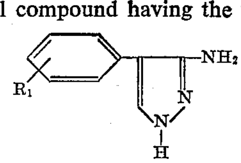

wherein $R_1$ is trifluoromethylsulfonyl.

5. A chemical compound having the formula:

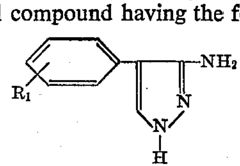

wherein $R_1$ is nitro.

6. 3-amino-4-(4'-chlorophenyl)pyrazole.
7. 3-amino-4-(4'-trifluoromethylphenyl)pyrazole.
8. 3-amino-4-(4'-nitrophenyl)pyrazole.
9. 3-amino-4-(4'-fluorophenyl)pyrozole.
10. 3-amino-4-(4'-chlorophenyl)pyrazole hydrochloride.
11. The method of preparing chemical compounds having the formula:

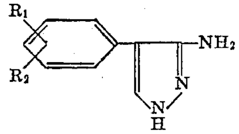

wherein:

$R_1$ is hydrogen, and $R_2$ is a member selected from the group consisting of chloro, bromo, fluoro, trifluoromethylsulfonyl, trifluoromethyl and nitro, comprising reacting a formylphenylacetonitrile having the formula:

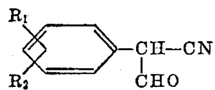

wherein:

$R_1$ is hydrogen, and $R_2$ is a member selected from the group consisting of chloro, bromo, fluoro, trifluoromethylsulfonyl, trifluoromethyl and nitro, with hydrazine in the presence of an excess of glacial acetic acid.

12. The method in accordance with claim 11 characterized in that the reaction is carried out with the azeotropic distillation of water.

13. The method in accordance with claim 12 characterized in that $R_1$ is hydrogen and $R_2$ is 4-chloro.

14. The method in accordance with claim 12 characterized in that $R_1$ is hydrogen and $R_2$ is 4-trifluoromethyl.

References Cited in the file of this patent

FOREIGN PATENTS 788,140 Great Britain ---------- Dec. 23, 1957

OTHER REFERENCES

Elderfield: Heterocyclic Compounds, vol. 5, p. 139 (1957).

Panizzi: Chem. Abstracts, vol. 42, col. 904 (1948).

Parham et al.: J. Am. Chem. Soc., vol. 73, pp. 4664–4667 (1951).